(12) United States Patent
Xue

(10) Patent No.: US 12,719,367 B2
(45) Date of Patent: Aug. 25, 2026

(54) SWITCHING REGULATOR AND METHOD FOR CONTROLLING SWITCHING REGULATOR

(71) Applicant: Renesas Design (UK) Limited, Bourne End (GB)

(72) Inventor: Dashun Xue, Chandler, AZ (US)

(73) Assignee: Renesas Design (UK) Limited, Bourne End (GB)

( * ) Notice: Subject to any disclaimer, the term of this patent is extended or adjusted under 35 U.S.C. 154(b) by 192 days.

(21) Appl. No.: 18/539,585

(22) Filed: Dec. 14, 2023

(65) Prior Publication Data

US 2025/0202358 A1 Jun. 19, 2025

(51) Int. Cl.

*H02M 3/158* (2006.01)
*H02M 1/00* (2006.01)
*H02M 3/156* (2006.01)

(52) U.S. Cl.

CPC ......... *H02M 3/158* (2013.01); *H02M 1/0003* (2021.05); *H02M 3/156* (2013.01)

(58) Field of Classification Search

CPC .. H02M 1/0003; H02M 1/0025; H02M 3/156; H02M 3/158

See application file for complete search history.

(56) References Cited

U.S. PATENT DOCUMENTS

2013/0063102 A1* 3/2013 Chen ..................... H02M 3/156 323/234
2014/0049235 A1* 2/2014 Li ......................... H02M 3/156 323/271
2017/0201178 A1* 7/2017 Cheng ................ H02M 3/1582

OTHER PUBLICATIONS

Wiley Electrical and Electronics Engineering Dictionary, Steven M. Kaplan, p. 116 (Year: 2004).*

* cited by examiner

*Primary Examiner* — Alex Torres-Rivera
(74) *Attorney, Agent, or Firm* — SCULLY, SCOTT, MURPHY & PRESSER, P.C.

(57) ABSTRACT

The present document describes a switching regulator (100) configured to generate an output voltage (VOUT) based on an input voltage (VDD) using at least one power switch (101) and an inductor. The switching regulator (100) comprises a first control circuit (120, 130) configured to generate a first control signal (131) for turning off the power switch (101), in dependence of a level of the inductor current (104) through the inductor. Furthermore, the switching regulator (100) comprises a second control circuit (200) configured to generate a second control signal (212) for turning on the power switch (101), in dependence of a level of the output voltage (VOUT).

12 Claims, 7 Drawing Sheets

SWITCHING REGULATOR AND METHOD FOR CONTROLLING SWITCHING REGULATOR

TECHNICAL FIELD

Figure 1A:
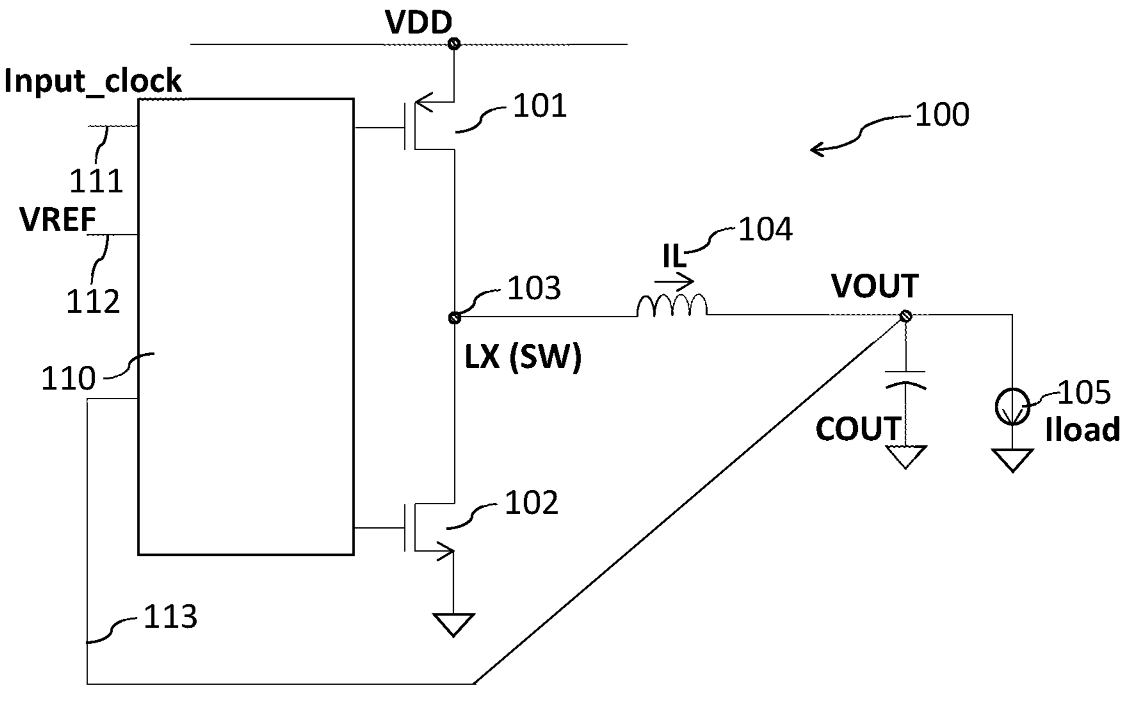

The present document relates to a switching regulator. In particular, the present document relates to a method for controlling a switching regulator (such as a DC-DC converter and/or a Buck, Boost or Buck/Boost converter).

BACKGROUND

A scheme for controlling a switching regulator is current-mode control, which makes use of a clock signal for turning on one of the power switches of the switching regulator. The current-mode control scheme may exhibit a sub-harmonic issue, when the duty cycle reaches a certain limit (e.g., a duty cycle which is larger than 50%, when using the peak control current mode for a buck converter). Slope compensation may be used to address this stability issue, which however, reduces the bandwidth of the control loop and increases the response time of the regulator (subject to a load transient). Furthermore, the current-mode control may exhibit a clock latency issue (subject to a load transient), because the switching of one of the power switches is directly controlled by the clock signal.

The present document is directed at the technical problem of providing a fast and stable control scheme for a switching regulator.

SUMMARY

According to an aspect, a switching regulator is described, which is configured to generate an output voltage based on an input voltage using at least one power switch and an inductor. The switching regulator comprises a first control circuit which is configured to generate a first control signal for (repeatedly) turning off the power switch, wherein the first control signals is generated in dependence of the level of the inductor current through the inductor. Furthermore, the switching regulator comprises a second control circuit configured to generate a second control signal for (repeatedly) turning on the power switch, wherein the second control signal is generated in dependence of the level of the output voltage.

According to a further aspect, a method for controlling a switching regulator is described, wherein the switching regulator is configured to generate an output voltage based on an input voltage using at least one power switch and an inductor. The method comprises generating a first control signal for turning off the power switch, in dependence of the level of the inductor current through the inductor. Furthermore, the method comprises generating a second control signal for turning on the power switch, in dependence of the level of the output voltage.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner

SHORT DESCRIPTION OF THE FIGURES

Figure 1B:
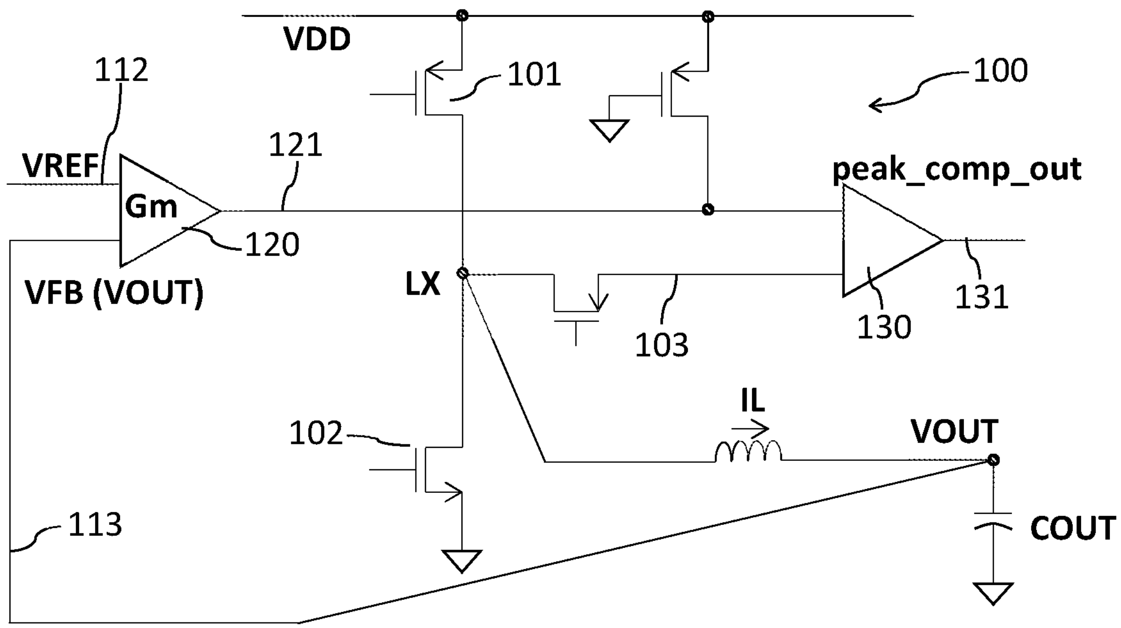
Figure 1C:
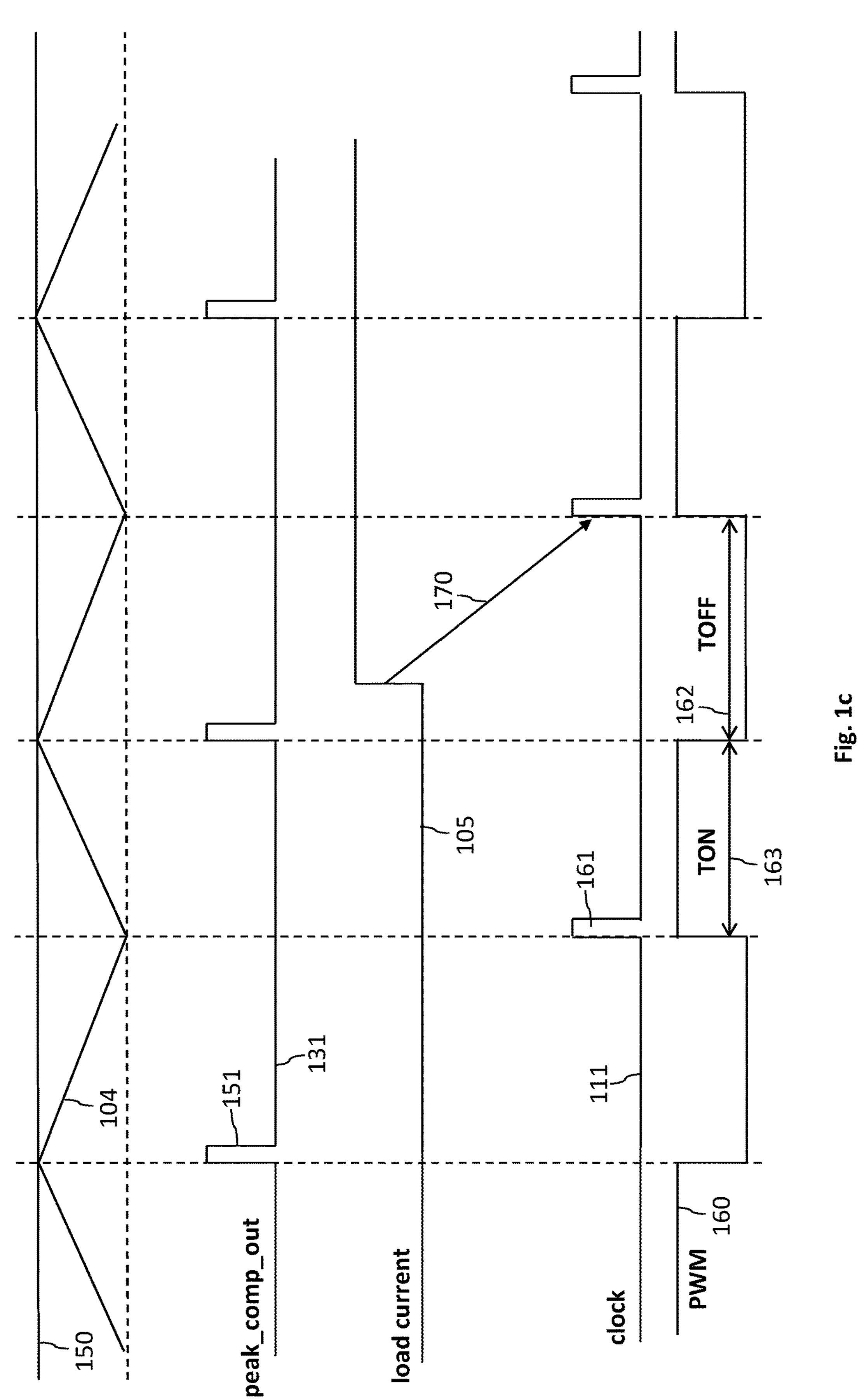
Figure 2A:
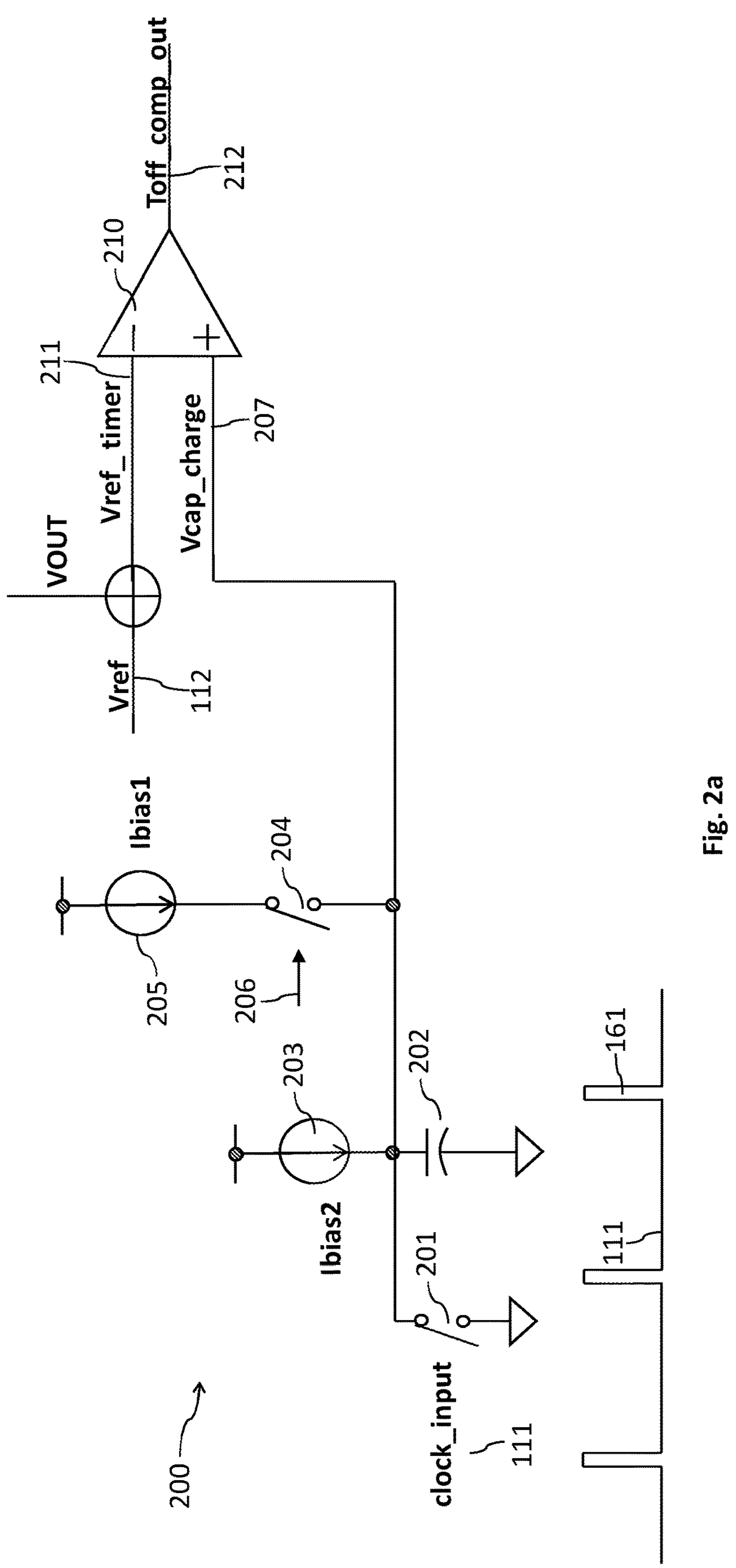
Figure 2B:
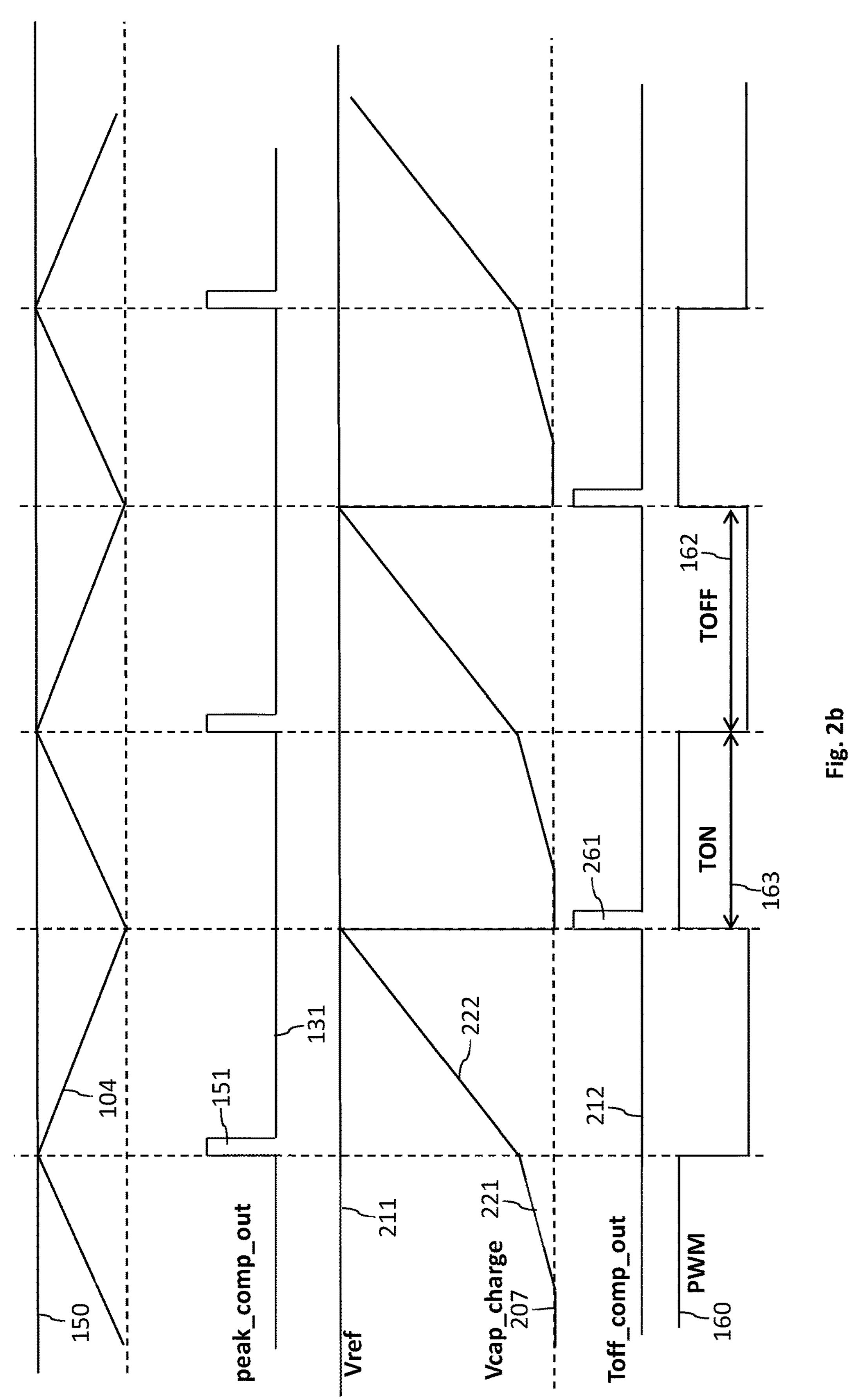
Figure 2C:
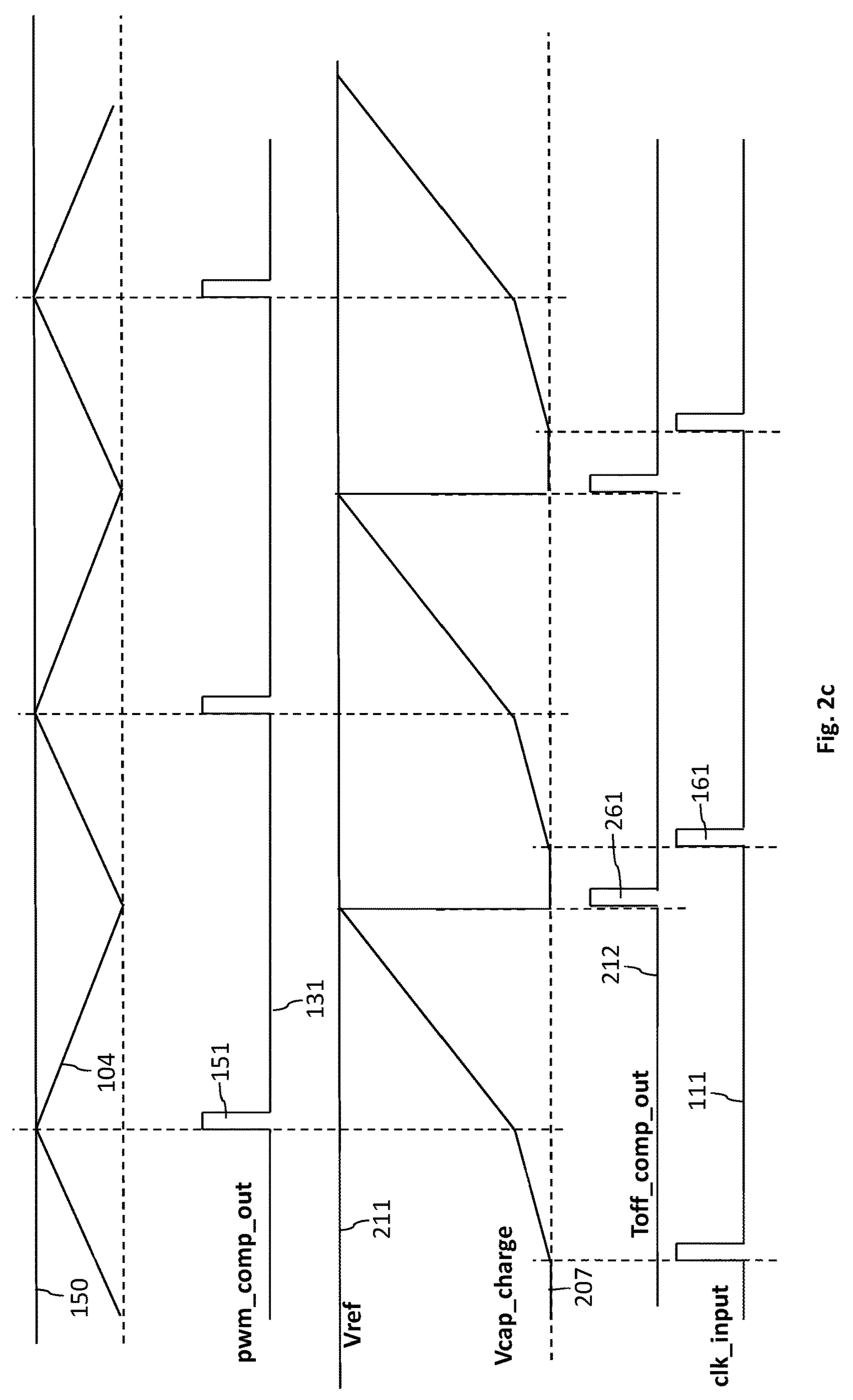
Figure 2D:
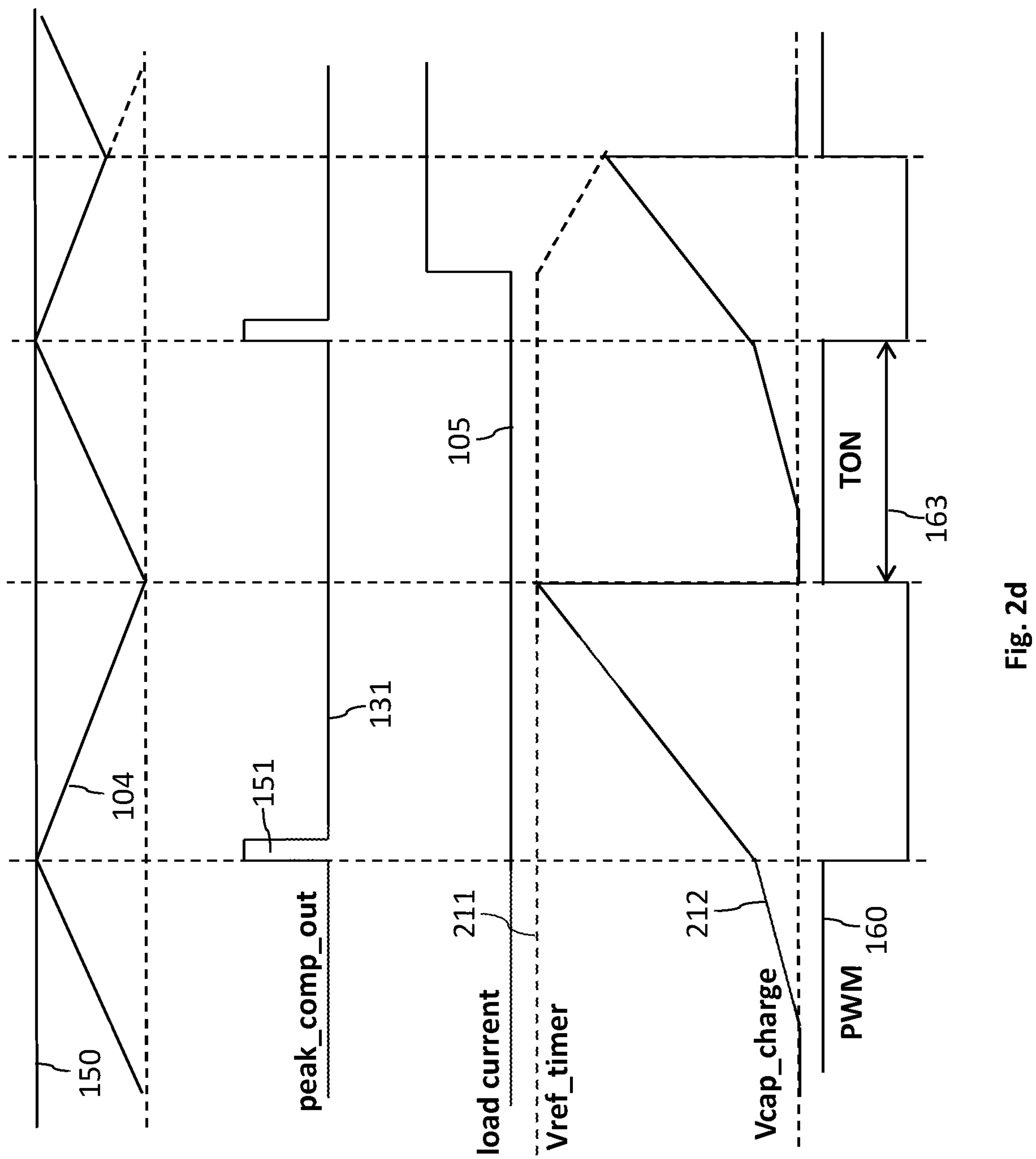
Figure 3:
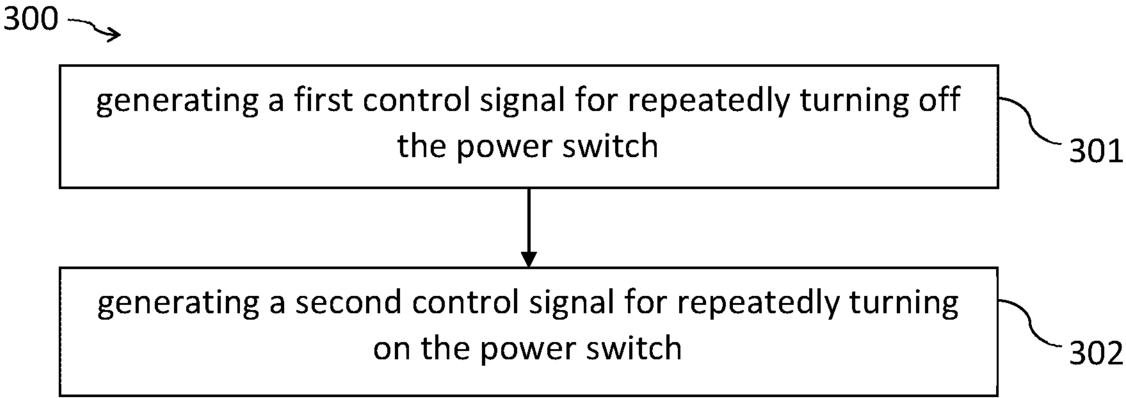

The invention is explained below in an exemplary manner with reference to the accompanying drawings, wherein FIG. 1*a* shows an example switching regulator and/or voltage regulator;

FIG. 1*b* shows an example control circuit for controlling a switching regulator;

FIG. 1*c* shows example measurement signals during operation of a switching regulator;

FIG. 2*a* shows an example control circuit for generating a control signal for controlling a power switch of a switching regulator;

FIGS. 2*b* to 2*d* shows example measurement signals during operation of a switching regulator; and FIG. 3 shows a flow chart of an example method for controlling a switching regulator.

DETAILED DESCRIPTION

As indicated above, the present document is directed at controlling a (voltage) switching regulator in a stable manner, such that the switching regulator exhibits a relatively low reaction time subject to a load transient. In this context, FIG. 1*a* shows an example switching regulator 100, in particular a buck converter, which comprises a high-side power switch 101 and a low-side power switch 102, which are arranged in series between the supply or input voltage VDD and ground. The switching node LX between the power switches 101, 102 is coupled to the output via an inductor. The output voltage VOUT is fed back as a feedback voltage 113 to the control unit 110 of the switching regulator 100. The control unit 110 is configured to control the power switches 101, 102 in dependence of a reference voltage VREF 112 (for the output voltage VOUT), in dependence of the feedback voltage 113 and in dependence of a clock signal 111 (for setting the switching frequency of the switching regulator 100).

FIG. 1*b* shows further details regarding the control unit 110. In particular, FIG. 1*b* illustrates how the reference voltage 112 is compared to the feedback voltage VFB 113 using an amplifier unit Gm 120 to provide a control signal 121 for controlling a sense FET (field effect transistor). The voltage which is provided by the sense FET may be compared with a voltage 103 that is indicative of the inductor current IL 104 through the inductor using a comparator unit 130, to provide a control signal peak_comp_out 131, which may be used for controlling the power switches 101, 102. The control signal peak_comp_out 131 may be referred to herein as the first control signal.

As illustrated in FIG. 1*c*, the control signal peak_comp_out 131 may be generated such that a control pulse 151 is generated, each time the inductor current 104 reached a pre-determined peak-current 150, wherein the peak-current 150 is set by the Gm unit 120 in conjunction with the sense FET. The control signal peak_comp_out 131 may be used to trigger the turn-off of the high-side power switch 101 of the regulator 100. On the other hand, the clock signal 111, in particular, the clock pulses 161 of the clock signal 111 may be used to trigger the turn-on of the high-side power switch 101. Hence, the clock signal 111 may be used to set the total length of a cycle period, and the control signal peak_comp_out 131 may be used to set the duration of the duty cycle within the cycle period.

FIG. 1*c* shows a PWM (pulse width modulation) signal 160 for controlling the power switches 101, 102. In can be seen that an on-period 163, during which the high-side power switch 101 is turned on (and the low-side power switch 102 is turned off), starts with a pulse 161 of the clock signal 111 and ends with a pulse 151 of the (first) control signal peak_comp_out 131. Furthermore, the subsequent off-period 162, during which the high-side power switch 101 is turned off (and the low-side power switch 102 is turned on), starts with the pulse 151 of the (first) control signal peak_comp_out 131 and ends with the subsequent pulse 161 of the clock signal 111.

FIG. 1*c* illustrates the load current 105 of a load at the output of the regulator 100. The load current 105 exhibits an abrupt increase during an off-period 162. Due to the fact that the off-period 162 is only ended by the subsequent pulse 161 of the clock signal 111 (see pointer 170), the regulator 100 reacts with a relatively large latency to the increase of the load current 105.

In the present document, a control scheme for controlling a switching regulator 100 is described, which comprises circuitry for generating a second control signal for setting the end of the off-period 162 and the beginning of the subsequent on-period 163, such that the second control signal may deviate from the clock signal 111 subject to a load transient, notably subject to a load increase.

FIG. 2*a* shows an example (second) control circuit 200 for generating the second control signal Toff_comp_out 212. The circuit 200 comprises a capacitor 202 which is charged using one or more current sources Ibias2 203, Ibias1 205. Furthermore, the capacitor 202 may be discharged using a reset switch 201, which is arranged in parallel to the capacitor 202. The reset switch 201 may be controlled in dependence of the clock signal 111. In particular, the reset switch 201 may be closed at each pulse 161 of the clock signal 111, thereby causing the capacitor 202 to be fully discharged.

Following a pulse 161 of the clock signal 111, the reset switch 201 may be opened and may be maintained open (until the next pulse 161 of the clock signal 111), such that the capacitor 202 is (continuously) charged using the second current source Ibias2 203. As a result of this, the capacitor voltage 207 increases with a basic gradient 221, as illustrated in FIG. 2*b*. The (second) control circuit 200 further comprises a first current source Ibias1 205 which is coupled to the capacitor 202 via a control switch 204. The control switch 204 may be closed using the control signal 206, thereby causing the capacitor 202 to be charged with the currents from the second current source 203 and from the first current source 205, such that the capacitor voltage 207 increases with an increased gradient 222 which is higher than the basic gradient 221. The control signal 206 for controlling the control switch 204 may be generated in dependence of the first control signal peak_comp_out 131. In particular, a pulse 131 of the first control signal peak_comp_out 131 may trigger the control switch 204 to close, thereby increasing the (temporal) gradient 222 for increasing the capacitor voltage 207.

Hence, the capacitor 202 is charged with the sum of the currents provided by the second current source 203 and by the first current source 205 during the (entire) off-period 162 of the power switch 101 of the regulator 100. On the other hand, the capacitor 202 is charged only with the current provided by the second current source 203 during the on-period 163 of the power switch 101.

The capacitor voltage 207 may be compared to a comparison voltage 211 using a comparator 210, wherein the comparison voltage 211 may be dependent on the deviation of the output voltage VOUT of the regulator 100 from the reference voltage Vref 112. Typically, the comparison voltage 211 drops, if the output voltage VOUT of the regulator 100 drops. The second control signal Toff_comp_out 212 may be provided at the output of the comparator 210. The second control signal Toff_comp_out 212 may exhibit a pulse 261, each time the capacitor voltage 207 reaches the comparison voltage 211. A pulse 261 of the second control signal Toff_comp_out 212 may trigger the end of the off-period 162 and the beginning of the subsequent on-period 163. Furthermore, a pulse 261 of the second control signal Toff_comp_out 212 will reset and/or pull down the capacitor voltage 207 to 0V.

As shown in FIG. 2*c*, the pulses 261 of the second control signal Toff_comp_out 212 may deviate from the pulses 161 of the control signal 111. In particular, a load increase may lead to a voltage drop of the output voltage VOUT of the regulator 100, which leads to a corresponding drop of the comparison voltage 211 (as illustrated in FIG. 2*d*). As a result of this, the time instant, at which the capacitor voltage 207 reaches the comparison voltage 211, is moved forward, thereby moving forward the pulse 261 of the second control signal Toff_comp_out 212 and by consequence the beginning of the subsequent on-period 163.

Hence, the frequency of a switching regulator 100 may be controlled by using a control circuit 200 in PWM mode (CCM (continuous conduction mode) and/or heavy load condition). As a result of this, a fast transient response (line-transient, load-transient, etc.) may be achieved. Furthermore, the control circuit 200 may be used in multi-phase converters.

As outlined in the context of FIGS. 1*a* and 1*b*, the VDD may be the input power rail and VOUT may be the output voltage at an output capacitor COUT of a regulator 100. The regulator 100 may achieve buck, boost and/or buck/boost mode. A sense FET, e.g., a PMOS sense device, may be driven by the output 121 of the Gm unit 120. The Gm unit 120 senses the feedback signal VFB 113 (which is proportional to VOUT) and the reference voltage VREF 112. A voltage comparator 130 compares the drain voltage of the sense FET and the voltage 103 provided by the LX node.

The control circuit 200 makes use of the clock signal clock_input 111 for controlling a bias current Ibias2 203 to charge the capacitor 202 periodically. The clock_input 111 has the desired switching frequency of the regulator 100. The bias current Ibias1 205 charges the capacitor 202 in dependence of a control signal PWM_b 206. The PWM_b signal 206 may be generated in a digital controller. A comparator 210 compares a DC voltage Vref 211 and the voltage 207 Vcap_charge on the capacitor 202, and generates the output signal Toff_comp_out 212, i.e., the second control signal.

It can be shown that a time error of the PWM signal 160 (which may be caused by noise, etc.) can be attenuated in the feedback loop and that the switching frequency of the regulator 100 converges towards the frequency of clock_input signal 111 after a few clock cycles.

FIG. 3 shows a flow chart of an example method 400 for controlling a switching regulator 100, wherein the switching regulator 100 is configured to generate an output voltage VOUT based on an input voltage VDD using at least one power switch 101 and an inductor. The method 300 comprises generating 301 a first control signal 131 for turning off the power switch 101, in dependence of the level of the inductor current 104 through the inductor. The first control signal 131 may be generated using peak current control or valley current control of the inductor current 104.

Furthermore, the method 300 comprises generating 302 a second control signal 212 for turning on the power switch 101, in dependence of the level of the output voltage VOUT, in particular in dependence of the deviation of the output voltage VOUT from the reference voltage Vref 112 for the output voltage VOUT. As outlined in the present document, a capacitor voltage 207 may be generated, notably in dependence of the clock signal 111 (for setting the switching frequency of the switching regulator 100) and/or in dependence of the duration of the off-period 162 (during which the power switch 101 is turned off). The capacitor voltage 207 may be compared to a comparison voltage 211 which dependents on the value of the output voltage VOUT, in order to generate the second control signal 212.

Subject to an increase of the load current 105 (and a corresponding drop of the value of the output voltage VOUT), the second control signal 212 may deviate from the clock signal 111, thereby enabling the voltage regulator 100 to react to the increase of the load current 105 in a stable and fast manner.

Hence, a switching regulator 100 is described, which is configured to generate an output voltage VOUT based on an input voltage VDD using at least one power switch 101 and an inductor. The switching regulator 100 may comprise, e.g., may be, a buck converter, a boost converter and/or a buck/boost converter.

The switching regulator 100 comprises a first control circuit 120, 130 which is configured to generate a first control signal 131 for turning off the power switch 101. The first control signal 131 may be generated in dependence of the level of the inductor current 104 through the inductor. The first control circuit 120, 130 may be configured to generate the first control signal 131 for turning off the power switch 101, in dependence of a comparison of the level of the inductor current 104 with a target peak value or a target valley value for the inductor current 104. In particular, the first control signal 131 may be generated using peak current or valley current control of the inductor current 104. The first control signal 131 may comprise a sequence of pulses 151, wherein each pulse 151 of the first control signal 131 may be used to turn off the power switch 101. Hence, each off-period 162 of the power switch 101 may be started by a pulse 151 of the first control signal 131, and/or each on-period 163 of the power switch 101 may be ended by a pulse 151 of the first control signal 131.

Furthermore, the switching regulator 100 comprises a second control circuit 200 configured to generate a second control signal 212 for turning on the power switch 101. The second control signal 212 may be generated in dependence of the level of the output voltage VOUT, in particular in dependence of the deviation of the level of the output voltage VOUT from the reference voltage 112 of the switching regulator 100. The second control signal 212 may comprise a sequence of pulses 261, wherein each pulse 261 of the second control signal 212 may turn on the power switch 101. Hence, each on-period 163 of the power switch 101 may be started by a pulse 261 of the second control signal 212, and/or each off-period 162 of the power switch 101 may be ended by a pulse 261 of the second control signal 212.

The second control circuit 200 may be configured to generate the second control signal 212 in dependence of the clock signal 111 for setting the switching frequency of the switching regulator 100. The second control signal 212 may be generated such that during steady state operation (with a constant load current 105) of the switching regulator 100, the second control signal 212 is aligned with the clock signal 111. During steady state operation, the pulses 261 of the second control signal 212 may correspond to the pulses 161 of the clock signal 111. In particular, during steady state operation, the pulses 261 of the second control signal 212 and the pulses 161 of the clock signal 111 may correspond to one another in a one-to-one correspondence, such that each pulse 161 of the clock signal 111 has a corresponding pulse 261 within the second control signal 212. The individual pulses 261 within the second control signal 212 may occur at the same time instants as their corresponding pulses 161 of the clock signal 111. As a result of this, a particularly stable operation of the switching regulator may be achieved.

The second control circuit 200 may comprise a capacitor 202 which is charged during an (notably during each) off-period 162 of the power switch 101 to provide a capacitor voltage 207. The capacitor voltage 207 may increase (during an off-period 162 of the power switch 101) with a certain gradient 221, 222.

Furthermore, the second control circuit 200 may comprise a comparator 210 which is configured to compare the capacitor voltage 207 with a comparison voltage 211 that is dependent on the level of the output voltage VOUT. The second control circuit 200 is configured to generate the comparison voltage 211 in dependence of the deviation of the value of the output voltage VOUT from the reference voltage 112. As a result of the comparison, e.g., at the output of the comparator 210, the second control signal 212 may be provided. By making use of a (progressively increasing) capacitor voltage 207, the second control signal 212 may be generated in a particularly robust manner.

The second control circuit 200 may be configured to reset the capacitor voltage 207 in dependence of the clock signal 111 for setting the switching frequency of the switching regulator 100. Alternatively, or in addition, the second control circuit 200 may comprise a reset switch 201 which is arranged in parallel to the capacitor 202 and which is controlled using the clock signal 111. The capacitor voltage 207 may be reset at each pulse 161 of the clock signal 111. By resetting the capacitor voltage 207 in dependence of the clock signal 111, a particularly robust and precise switching frequency may be achieved.

The second control circuit 200 may comprise a first current source 205 which is configured to charge the capacitor 202 via a control switch 204 using a first current. The second control circuit 200 may be configured to close the control switch 204 such that the capacitor 202 is charged with the first current that is provided by the first current source 205.

The control switch 204 may be controlled in dependence of the first control signal 131. Alternatively, or in addition, the second control circuit 200 may be configured to close the control switch 204 at the beginning of an (e.g., each) off-period 162 of the power switch 101. Furthermore, the second control circuit 200 may be configured to maintain the control switch 204 closed during the (entire) off-period 162 of the power switch 101.

Hence, the second control circuit 200 may be configured to generate a capacitor voltage 207 which is indicative of and/or dependent on the duration of the off-period 162 of the power switch 101, thereby enabling a particular precise control of the switching regulator 100.

The second control circuit 200 may comprise a second current source 203 which is configured to continuously charge the capacitor 202 using a second current, such that the capacitor voltage 207 increases with a basic gradient 221, if the capacitor 202 is charged using the second current alone. On the other hand, the capacitor voltage 207 may increase with an increased gradient 222, if the control switch 204 is closed, and/or if the capacitor 202 is charged using the second current provided by the second current source 203 and the first current provided by the first current source 205. The increased gradient 222 may be higher than the basic gradient 221. By providing a second current source 203 which continuously charges the capacitor 202, the robustness of the control scheme may be increased further.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A switching regulator configured to generate an output voltage based on an input voltage using at least one power switch and an inductor, wherein the switching regulator comprises:

a first control circuit configured to generate a first control signal for turning off the power switch, in dependence of a level of an inductor current through the inductor; and a second control circuit configured to generate a second control signal for turning on the power switch, in dependence of a level of the output voltage, wherein the second control circuit comprises:

a capacitor configured to be charged during an off-period of the power switch to provide a capacitor voltage; and a comparator configured to compare the capacitor voltage with a comparison voltage that is dependent on the level of the output voltage, to provide the second control signal.

2. The switching regulator of claim 1, wherein:

the second control circuit is configured to reset the capacitor voltage in dependence of a clock signal for setting a switching frequency of the switching regulator; and the second control circuit comprises a reset switch which is arranged in parallel to the capacitor and which is controlled using the clock signal.

3. The switching regulator of claim 1, wherein:

the second control circuit comprises a first current source which is configured to charge the capacitor via a control switch; and the second control circuit is configured to close the control switch such that the capacitor is charged with a first current that is provided by the first current source.

4. The switching regulator of claim 3, wherein the control switch is controlled in dependence of the first control signal.

5. The switching regulator of claim 3, wherein the second control circuit is configured to:

close the control switch at a beginning of an off-period of the power switch; and maintain the control switch closed during the off-period of the power switch.

6. The switching regulator of claim 3, wherein the second control circuit comprises a second current source which is configured to continuously charge the capacitor using a second current, such that the capacitor voltage increases with a basic gradient, if the capacitor is charged using the second current alone.

7. The switching regulator of claim 6, wherein:

the capacitor voltage increases with an increased gradient, if either the control switch is closed or if the capacitor is charged using the second current provided by the second current source and the first current provided by the first current source; and the increased gradient is higher than the basic gradient.

8. The switching regulator of claim 1, wherein the second control circuit is configured to generate the comparison voltage in dependence of a deviation of a value of the output voltage from a reference voltage.

9. The switching regulator of claim 1, wherein the first control circuit is configured to generate the first control signal for turning off the power switch, in dependence of a comparison of the level of the inductor current with a target peak value or a target valley value for the inductor current.

10. The switching regulator of claim 1, wherein:

the first control circuit is configured to generate the first control signal comprising a sequence of pulses, wherein each pulse of the first control signal turns off the power switch; and the second control circuit is configured to generate the second control signal comprising a sequence of pulses, wherein each one of the sequence of pulses of the second control signal turns on the power switch.

11. The switching regulator of claim 1, wherein the switching regulator comprises at least one of a buck converter, a boost converter and a buck-boost converter.

12. A method for controlling a switching regulator which is configured to generate an output voltage based on an input voltage using at least one power switch and an inductor; wherein the method comprises:

generating, by using a first control circuit, a first control signal for turning off the power switch, in dependence of a level of an inductor current through the inductor; and generating, by using a second control circuit, a second control signal for turning on the power switch, in dependence of a level of the output voltage, wherein generating the second control signal comprises:

charging a capacitor during an off-period of the power switch to provide a capacitor voltage; and comparing, by a comparator, the capacitor voltage with a comparison voltage that is dependent on the level of the output voltage, to provide the second control signal.

* * * * *